(No Model.) 2 Sheets—Sheet 2.
J. J. HICKEY.
WEIGHING SCALE.
No. 499,993. Patented June 20, 1893.
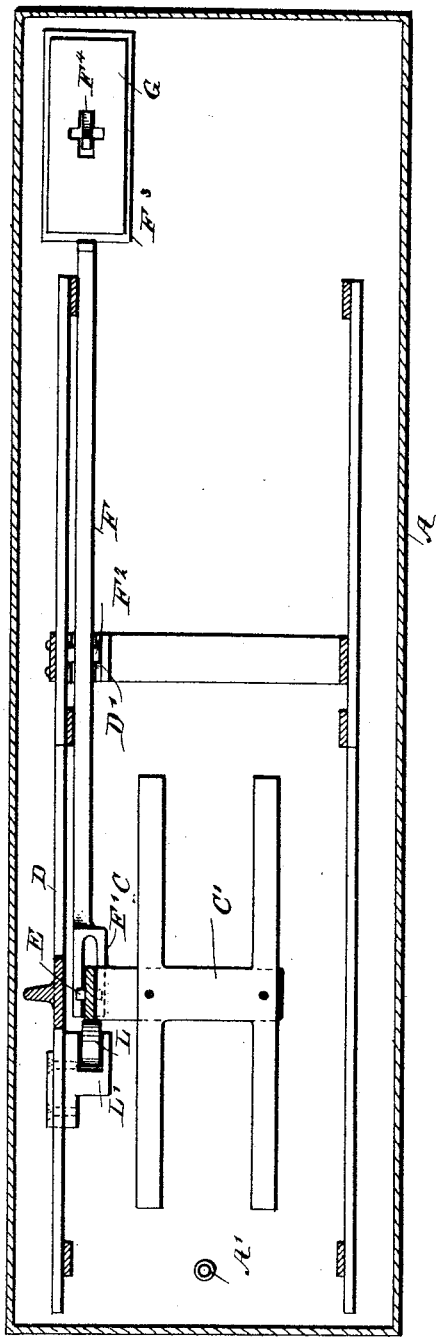
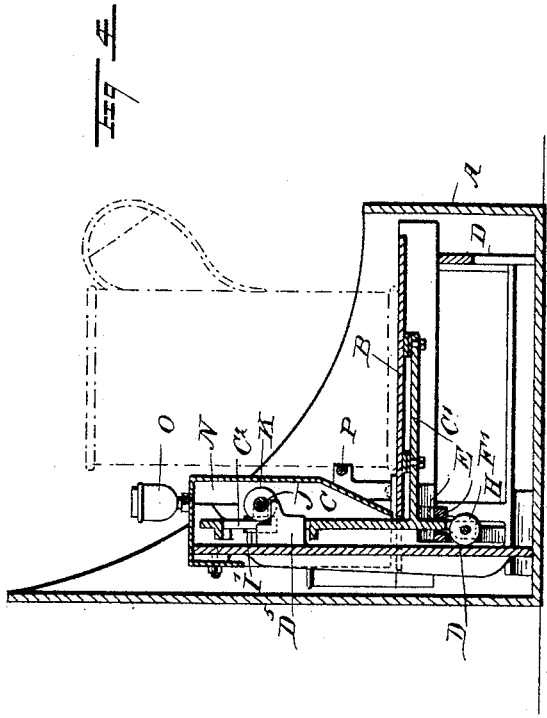
WITNESSES:
H. Walker
C. Sedgwick
INVENTOR
J. J. Hickey
BY
Munn & Co.
ATTORNEYS.

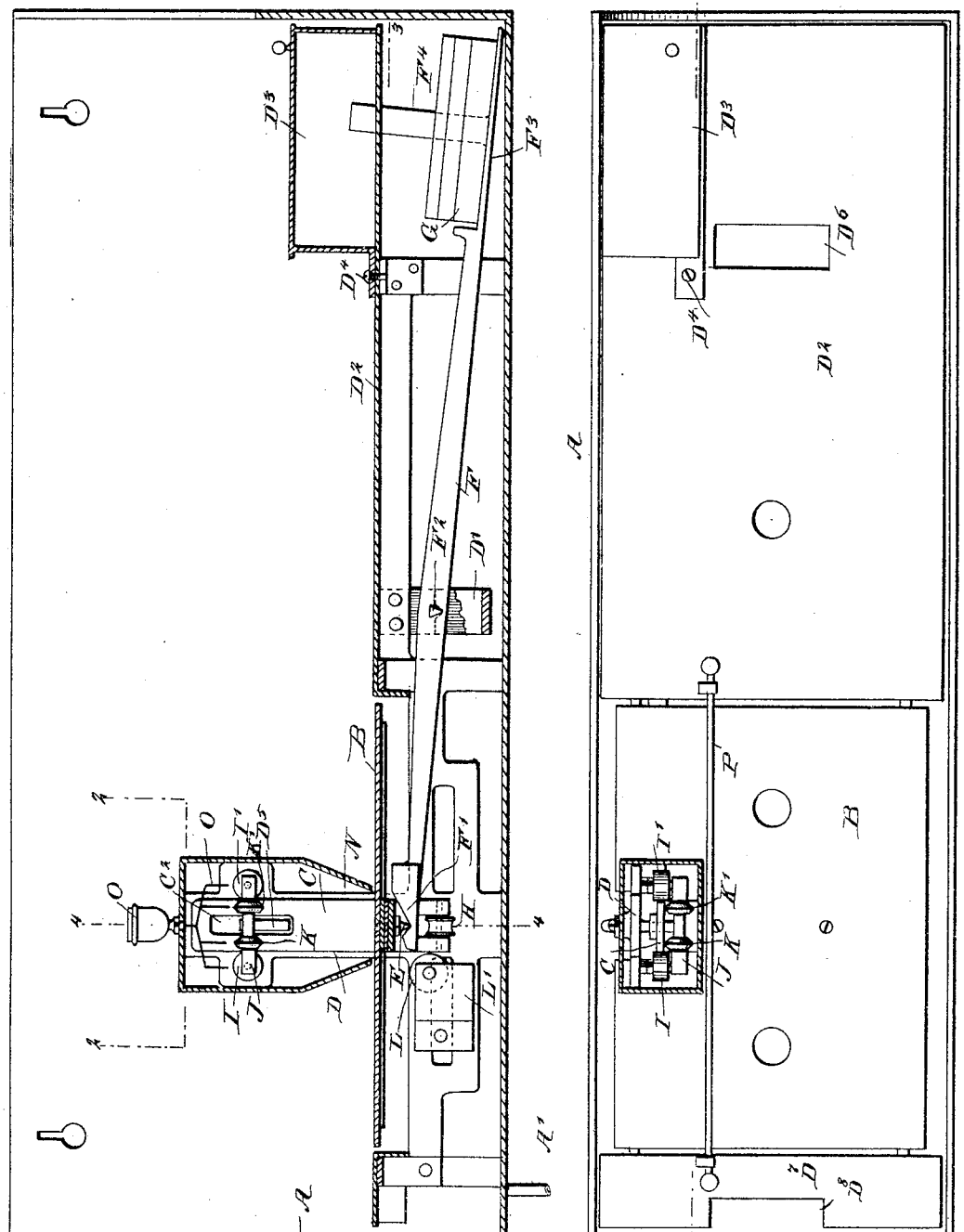

UNITED STATES PATENT OFFICE.

JOHN JOSEPH HICKEY, OF NEW YORK, N. Y.

WEIGHING-SCALE.

SPECIFICATION forming part of Letters Patent No. 499,993, dated June 20, 1893.

Application filed January 25, 1893. Serial No. 459,725. (No model.)

*To all whom it may concern:*

Be it known that I, JOHN JOSEPH HICKEY, of the city, county, and State of New York, have invented a new and Improved Weighing Apparatus, of which the following is a full, clear, and exact description.

The invention relates to apparatus for weighing liquids, and its object is to provide a new and improved apparatus which is simple and durable in construction, and arranged for automatically and accurately weighing any predetermined measure of a liquid.

The invention consists of a platform supported on a vertically sliding carrier, and a counterbalancing lever carrying at one end the said carrier and at its other end weights, each representing a certain predetermined measure.

The invention also consists of certain parts and details, and combinations of the same, as will be hereinafter described and then pointed out in the claims.

Reference is to be had to the accompanying drawings, forming a part of this specification, in which similar letters of reference indicate corresponding parts in all the views.

Figure 1 is a sectional side elevation of the improvement on the line 1—1 of Fig. 2. Fig. 2 is a plan view of the same with parts in section on the line 2—2 of Fig. 1. Fig. 3 is a sectional plan view of the same on the line 3—3 of Fig. 1; and Fig. 4 is a transverse section of the same on the line 4—4 of Fig. 1.

The improved measuring and weighing apparatus is arranged in a tray A, made of a suitable material, and located in the immediate neighborhood of a faucet or other means, through which the liquid is drawn into a measure, which is weighed with the contents to represent the desired quantity of the liquid to be sold. In this tray A is located a platform B, secured on a horizontally-disposed arm C', projecting from a vertically-arranged carrier C mounted to slide, as hereinafter more fully described, in suitable bearings held on a frame D set in the bottom of the tray A, as plainly shown in the drawings.

On the carrier C is secured a knife edge E, engaging a V-shaped bearing F' formed on the forward end of a counterbalancing lever F, provided with a knife edge F² set in a V-shaped bearing D' forming part of the frame D; see Figs. 1 and 3. The rear end of the counterbalancing lever F is somewhat enlarged as at F³, and is adapted to receive and support a series of weights G, each representing a certain predetermined measure or quantity of the liquid.

In order to hold the several weights in place on the enlarged end F³, I provide the latter with an upwardly-projecting arm F⁴, and form apertures in the center of the weights so that the arm projects through the apertures and thus holds the weights in place, as will be readily understood by reference to Fig. 3. The part of the tray not occupied by the platform B is covered by a plate D², secured on the frame D and serving to support the measure, glasses or other articles, and at the same time cover the counterbalancing lever F, which is arranged partly under the platform B, and the plate D².

In order to conveniently place weights G on the end F³ of the lever F or remove the same from the weights, I form in the corner of the plate D², a recess covered by a hood D³, pivoted at D⁴ to the top of the plate D² and adapted to be swung to one side so as to give access to the recess in the plate D² to insert or remove the weights G.

In order to properly guide the carrier C in its up and down movement caused by the oscillating of the lever F, I provide the lower end of the carrier C with a friction roller H, having on its rim two sharp circular edges traveling on the back of the frame D, it being understood that the said friction roller is located below the knife edge E. The upper end of the carrier C travels at its sides on friction rollers I and I', journaled on a frame J, made approximately U-shaped, and secured to an upwardly-extending arm of the frame D, as plainly shown in Figs. 1 and 2. On the middle part of this frame J are journaled two rollers K and K', each having a V-shaped rim, the apex of which engages the front face of the carrier C, so as to reduce the friction of the traveling carrier to a minimum. The lower outermost side edge of the carrier C is in frictional contact with another friction roller L, journaled in a block L', held longitudinally adjustable in the back of the frame D, so that the said edge of the carrier travels easily on the friction roller, to assist in reducing the friction of the sliding carrier to a minimum in conjunction with the other rollers.

It is understood that when a measure, weight or other device is placed on the platform B, then the weighted platform bears on the knife edge E, and the carrier C, in such a manner that the lever F is depressed at its front end, as soon as the additional weight of the platform counterbalances the weights G. At the same time the weighted platform B causes a forward pull of the upper part of the carrier C, so that the front face of the carrier is firmly held in frictional contact with the sharp beveled edges of the friction rollers K K', and the lower friction roller H is pressed in contact with the back of the frame D, so that the up and down sliding motion of the carrier C takes place without much friction, as all the bearing surfaces of the said carrier are in contact with the friction rollers.

In the upper end of the carrier C is formed an opening $C^2$, into which projects a lug $D^5$, projecting from the frame D and which serves to limit the up and down swinging motion of the lever F. The part of the carrier and frame D projecting above the platform B when the latter is in its uppermost position is covered by a hood N, fastened by screws or other means to the frame D, and this hood N carries a lubricating cup O, of any approved construction, and from which extend wires O' leading to the frictional rollers I, I', K, K' to lubricate the same. The fixed plate $D^2$ is formed at its right hand end with an aperture or hand hole $D^6$, and the left hand end $D^7$ of the said plate $D^2$ is provided with a recess $D^8$, to serve in removing the frame D and all the parts of the measuring device supported thereon from the tray A for cleaning or other purposes, it being understood that the operator in removing the device from the tray uses the left hand in the recess $D^8$ and the right hand in the opening $D^6$ to obtain a firm hold of the device.

In front of the hood N extends longitudinally a guard rail P, reaching over the rear part of the platform B to prevent the measure set on the said platform from striking the said hood N, as will be readily understood by reference to Fig. 4.

It will be seen that when it is desired, say for instance, to sell five glasses of beer as a pint, for the value of ten cents, then the operator places weights G on the rear end $F^3$ of the lever F representing the weight of an amount of liquid corresponding to five glasses, and also an additional weight for the weight of the measure into which the liquid is to be drawn from the faucet, and from which, after the regular quantity has been obtained, the liquid is measured into the customer's vessel. Now, when the liquid is drawn into the measure set on the platform B, then as soon as the sufficient quantity of liquid has passed into the measure to counterbalance the weights G, then the platform B swings downward by the oscillating lever F, and the operator closes the faucet to stop a further quantity of liquid from passing into the measure. Now, the amount of liquid in the measure corresponds to the amount of the five glasses of beer. When it is desired to sell for the same amount of ten cents, more beer, say six glasses, then an additional weight G, representing the amount of beer contained in one glass is added to the weights on the lever F, and then the above described operation is repeated, that is, the liquid is permitted to flow into the measure until the latter counterbalances the lever and oscillates the same, so that the platform B swings downward. The amount of liquid now in the measure represents that of six glasses. It will be seen that by this arrangement, an accurate amount of liquid is given to the customer according to a predetermined weight indicated by the weights G representing a desired number of glasses.

Having fully thus described my invention, I claim as new and desire to secure by Letters Patent—

1. An apparatus of the class described, comprising a tray, a platform, a carrier supporting the said platform and mounted to slide vertically, a housing surrounding the carrier a counterbalancing lever carrying on one end the said carrier and at its other end weights each representing a certain predetermined measure of a liquid, and friction rollers mounted within the housing and forming guides for the carrier substantially as shown and described.

2. An apparatus of the class described, comprising a frame, a platform, a carrier mounted to slide vertically and provided with arms extending horizontally and supporting the said platform, friction rollers for the said carrier, arranged on the frame above and below the platform a lever connected by a knife edge with the said carrier, and removable weights for counterbalancing the said lever, substantially as shown and described.

3. An apparatus of the class described, comprising a frame, a counterbalancing lever hung on knife edges in the said frame, movable weights adapted to be supported on one end of the said lever, a carrier connected by knife edges with the other end of the said lever, the said carrier being provided with a horizontally-disposed arm, a platform secured to the arm of the said carrier, and a yoke on the frame embracing the carrier and provided with friction rollers for reducing the frictional contact between the said carrier and the said frame, substantially as shown and described.

4. An apparatus of the class described, comprising a frame, a counterbalancing lever hung on knife edges in the said frame, movable weights adapted to be supported on one end of the said lever, a carrier connected by knife edges with the other end of the said lever, the said carrier being provided with a horizontally-disposed arm, a platform secured to the arm of the said carrier, a friction roller arranged on the lower end of the said carrier and traveling on part of the said frame, an auxiliary frame attached to the said main frame and carrying friction rollers bearing on the side edges and front face of the upper part of the said carrier, and an additional friction roller held longitudinally adjustable on the said frame and bearing on the outer lower edge of the said carrier, substantially as shown and described.

5. A device of the class described, comprising a frame, cover plates secured to the said frame, a hood mounted to swing on the said frame, a counterbalancing lever hung on knife edges in the said frame, removable weights adapted to be supported on one end of the said lever, a carrier connected by knife edges with the other end of the said lever, the said carrier being provided with a horizontally-disposed arm, a platform secured to the arm of the said carrier, and friction rollers for reducing the frictional contact between the said carrier and the said frame, substantially as shown and described.

JOHN JOSEPH HICKEY.

Witnesses:
 THEO. G. HOSTER,
 C. SEDGWICK.